(12) United States Patent
Cleveland et al.

(10) Patent No.: US 7,224,742 B2
(45) Date of Patent: May 29, 2007

(54) APPARATUS AND METHOD FOR REDUCING THE PEAK-TO-AVERAGE POWER RATIO OF OFDM/OFDMA SIGNALS

(75) Inventors: Joseph R. Cleveland, Murphy, TX (US); Akshaya A. Trivedi, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/285,780

(22) Filed: Nov. 22, 2005

(65) Prior Publication Data
US 2006/0140296 A1    Jun. 29, 2006

Related U.S. Application Data

(63) Continuation-in-part of application No. 10/022,767, filed on Dec. 14, 2001, now Pat. No. 7,023,900.

(51) Int. Cl.
*H04K 1/10* (2006.01)
(52) U.S. Cl. ...................... 375/260; 375/295
(58) Field of Classification Search ............ 375/260, 375/273, 279, 295, 298, 308; 370/208, 209, 370/210, 319, 344
See application file for complete search history.

(56) References Cited

U.S. PATENT DOCUMENTS

| 6,130,918 | A  | * | 10/2000 | Humphrey et al. | ......... 375/295 |
| 6,952,394 | B1 | * | 10/2005 | Kim et al. | ................. 370/208 |
| 2003/0086363 | A1 | * | 5/2003 | Hernandez | ................. 370/208 |

* cited by examiner

*Primary Examiner*—Emmanuel Bayard

(57) ABSTRACT

An apparatus is provided for reducing the peak-to-average power ratio (PAPR) of a multicarrier transmission system. The apparatus comprises a detector for receiving a plurality of symbols to be transmitted and determining a peak amplitude of the plurality of symbols and a controller for determining if the peak amplitude associated with the plurality of symbols exceeds a predetermined threshold. If the peak amplitude exceeds the predetermined threshold, the apparatus generates at least one correction carrier signal. The at least one correction carrier signal is combined with a plurality of modulated carrier signals associated with the plurality of symbols to thereby reduce a peak-to-average power ratio associated with the plurality of modulated carrier signals.

29 Claims, 8 Drawing Sheets

APPARATUS AND METHOD FOR REDUCING THE PEAK-TO-AVERAGE POWER RATIO OF OFDM/OFDMA SIGNALS

CROSS-REFERENCE TO RELATED APPLICATION AND CLAIM OF PRIORITY

The present application is a continuation-in-part (CIP) of U.S. patent application Ser. No. 10/022,767, filed Dec. 14, 2001, now U.S. Pat. No. 7,023,900, entitled "System And Method For Modifying Peak-To-Average Power Ratio In CDMA Transmitters." U.S. patent application Ser. No. 10/022,767 is assigned to the assignee of the present application and is hereby incorporated by reference into the present disclosure as if fully set forth herein. The present application hereby claims priority under 35 U.S.C. §10 to U.S. patent application Ser. No. 10/022,767.

TECHNICAL FIELD OF THE INVENTION

This disclosure relates generally to communication systems and, more specifically, to a technique for reducing the peak-to-average power ratio (PAPR) of OFDM and OFDMA signals.

BACKGROUND OF THE INVENTION

Orthogonal frequency division multiplexing (OFDM) is a multi-carrier transmission technique in which a user transmits on many orthogonal frequencies (or sub-carriers). The orthogonal sub-carriers are individually modulated and separated in frequency such that they do not interfere with one another. This provides high spectral efficiency and resistance to multipath effects. An orthogonal frequency division multiple access (OFDMA) system allows some sub-carriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi) and IEEE-802.16 (e.g., WiMAX). This technology is also used for wireless digital audio and video broadcasting.

Conventional power amplifiers for amplifying multi-carrier signals are relatively expensive parts of a communication system. A key design parameter for OFDM/OFDMA power amplifiers is the requirement to minimize the generation of adjacent channel power (ACP) noise. ACP noise results from signal distortion caused by operation of power amplifier components in non-linear regions of the input-output characteristic such as when the power amplifier enters saturation. This distortion produces undesired spectral components in adjacent transmission channels.

Power amplifiers are more linear at lower input signal levels. Large input signals tend to drive a power amplifier into saturation. Thus, weaker signals experience less distortion and have lower ACP noise. However, a sudden large signal peak still results in distortion and ACP noise. This is especially problematic in systems that have large peak-to-average power ratios such as with OFDM/OFDMA. To avoid this, power amplifiers often operate in "back-off" mode (i.e., reduced input signal) in order to accommodate large signal peaks. However, operating in back-off mode requires the use of devices with higher power ratings which adds to system design, development and manufacturing costs. Furthermore, it may be inefficient and may generate excessive heat.

Therefore, there is a need for an improved OFDM/OFDMA transmission system that minimizes amplifier peak-to-average power ratio (PAPR) without suffering performance degradation.

SUMMARY OF THE INVENTION

An apparatus is provided for reducing the peak-to-average power ratio (PAPR) of a multicarrier transmission system. In one embodiment, the apparatus comprises: a detector for receiving a plurality of symbols to be transmitted and determining a peak amplitude of the plurality of symbols; and a controller for determining if the peak amplitude associated with the plurality of symbols exceeds a predetermined threshold. In response to a determination that the peak amplitude exceeds the predetermined threshold, the controller generates at least one correction carrier signal. The at least one correction carrier signal is combined with a plurality of modulated carrier signals associated with the plurality of symbols to thereby reduce a peak-to-average power ratio associated with the plurality of modulated carrier signals.

Another embodiment provides a method for reducing the peak-to-average power ratio (PAPR) of a multicarrier transmission system. The method comprises the steps of: receiving a plurality of symbols to be transmitted; determining a peak amplitude of the plurality of symbols; determining if the peak amplitude associated with the plurality of symbols exceeds a predetermined threshold; in response to a determination that the peak amplitude exceeds the predetermined threshold, generating at least one correction pulse; generating at least one correction carrier signal from the at least one correction pulse; and combining the at least one correction carrier signal with a plurality of modulated carrier signals associated with the plurality of symbols to thereby reduce a peak-to-average power ratio associated with the plurality of modulated carrier signals.

Another embodiment provides an apparatus for reducing the peak-to-average power ratio (PAPR) of a multicarrier transmission system. The apparatus comprises: a detector for receiving a plurality of symbols to be transmitted and determining a peak amplitude of the plurality of symbols; a controller for determining if the peak amplitude associated with the plurality of symbols exceeds a predetermined threshold and, in response to a determination that the peak amplitude exceeds the predetermined threshold, generating at least one correction pulse; and a PAPR reduction block for generating at least one correction carrier signal from the at least one correction pulse and combining the at least one correction carrier signal with a plurality of modulated carrier signals associated with the plurality of symbols to thereby reduce a peak-to-average power ratio associated with the plurality of modulated carrier signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged OFDM/OFDMA communication system.

A transmission technique is disclosed for reducing the peak-to-average power (PAPR) ratio—or crest factor ratio (CFR) of the transmitted waveform for multicarrier signals, such as orthogonal frequency division multiplexing (OFDM) or orthogonal frequency division multiple access (OFDMA) signals. The disclosed transmission technique adds a spectral distribution function of time-domain pulses to the OFDM/OFDMA subcarrier set in such a manner that it reduces the PAPR of the time-domain signal applied to a power amplifier. This technique introduces minimal degradation in signal detection by an OFDM receiver, since the correction terms to each subcarrier are orthogonal to each other.

Figure 1:
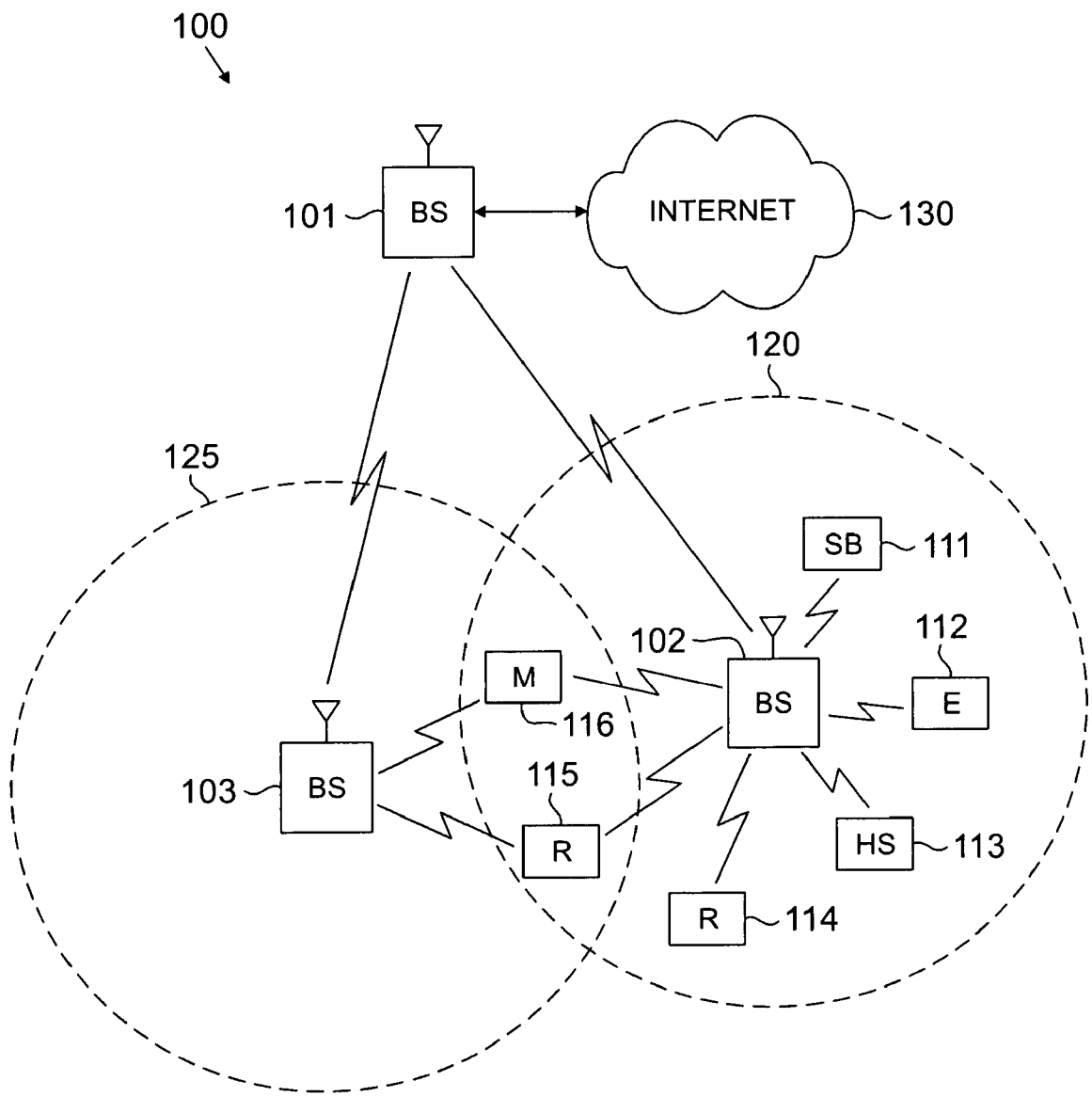
FIG. 1 illustrates an exemplary wireless network that reduces the peak-to-average power ratio (PAPR) of OFDM/OFDMA signals according to the principles of the present disclosure.

FIG. 1 illustrates exemplary wireless network 100, which reduces the peak-to-average power ratio (PAPR) of OFDM/OFDMA signals according to the principles of the present disclosure. In the illustrated embodiment, wireless network 100 includes base station (BS) 101, base station (BS) 102, and base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116.

In other embodiments, base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101–103 may communicate with each other and with subscriber stations 111–116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111–116 using OFDM and/or OFDMA techniques.

Base station 102 may provide T1 service to subscriber station 112 associated with the enterprise and fractional T1 service to subscriber station 111 associated with the small business. Base station 102 may provide wireless backhaul for subscriber station 113 associated with the WiFi hotspot, which may be located in, for example, an airport, cafe, hotel, or school campus. Base station 102 may provide digital subscriber line (DSL) service to subscriber stations 114, 115 and 116.

Subscriber stations 111–116 may access voice, data, video, video conferencing, and/or other broadband services via Internet 130. In an exemplary embodiment, one or more of subscriber stations 111–116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Dotted lines show the approximate extents of coverage areas 120 and 125, which are shown as approximately circular for the purposes of illustration and explanation only. It should be understood that the coverage areas associated with the base stations of wireless network 100 (e.g., coverage areas 120 and 125) may have other shapes, including irregular shapes, depending upon the configuration of the base stations and variations in the radio environment associated with natural and man-made obstructions.

Also, the coverage areas associated with base stations 102 and 103 are not constant over time and may be dynamic (i.e., expanding or contracting or changing shape) based on changing transmission power levels of the base station and/or the subscriber stations, weather conditions, and other factors. In an embodiment, the radii of the coverage areas of base stations 101–103 may extend in the range from about a few hundred meters to as much as fifty kilometers from the base stations.

As is well known in the art, a base station, such as base station 101, 102, or 103, may employ directional antennas to support a plurality of sectors within the coverage area. Although base stations 102 and 103 are depicted in FIG. 1 approximately in the center of coverage areas 120 and 125, respectively, in other embodiments, the use of directional antennas may locate base stations 102 and/or 103 near the edges of coverage areas, for example, at the point of a cone-shaped or pear-shaped coverage area.

The connection to Internet 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to Internet 130 may be provided by different network nodes and equipment.

In OFDM or OFDMA systems, quadrature phase shift keying (QPSK) modulation or higher-level QAM modulation (e.g., 16 QAM, 64 QAM, 256 QAM, etc.) may be used to modulate each subcarrier with I or Q bit streams. Because an OFDM signal is a composite of multiple carriers, each modulated by quadrature I and Q streams, the composite signal in the time domain does not exhibit a constant envelope, even if the symbol modulation of each subcarrier has a constant amplitude. The resulting envelope has undesirably high peak-to-average power ratio characteristics. Large peaks in the transmitted signal lead to distortion in the transmitted signal which generates ACP. To overcome the problems presented by large signal peaks, one or more of base stations 101–103 or subscriber stations 111–116 may reduce the peak-to-average power ratio (PAPR) of the OFDM/OFMDA signals to below a predetermined threshold level as described below in greater detail.

Figure 2:
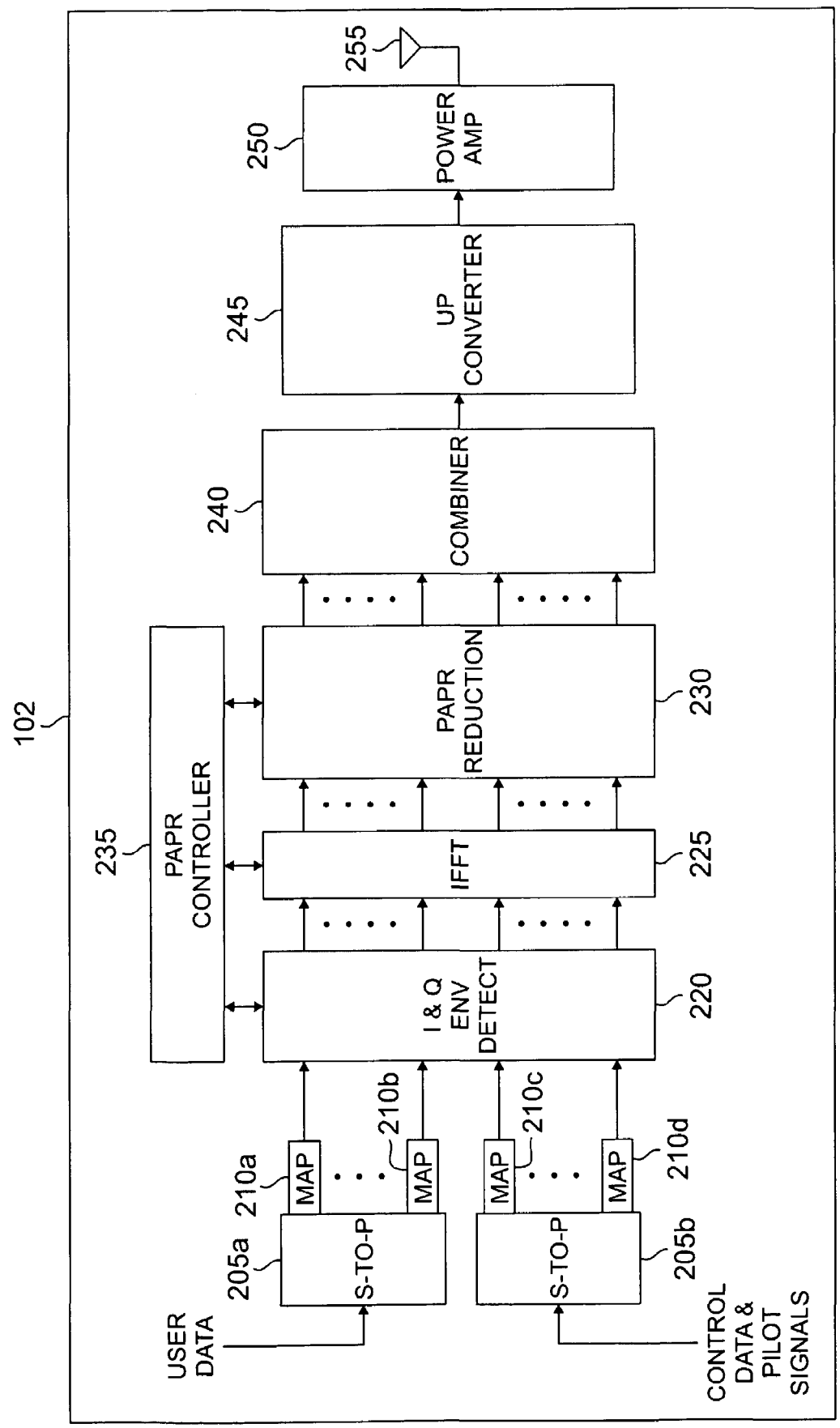
FIG. 2 illustrates an exemplary base station that reduces the PAPR of OFDM/OFDMA signals according to one embodiment of the present disclosure.

FIG. 2 illustrates base station 102, which reduces the peak-to-average power ratio (PAPR) of OFDM/OFDMA signals according to the principles of the present disclosure. Base station 102 is illustrated by way of example only. Base stations 101 and 103 are substantially similar to base station 102 and need not be illustrated and described separately. Additionally, one or more of subscriber stations 111–116 may also reduce the peak-to-average power ratio (PAPR) of OFDM/OFDMA signals according to the principles of the present disclosure. However, for the sake of simplicity and clarity, only base station 102 will be discussed in detail hereafter, except where otherwise noted.

According to an exemplary embodiment, base station 102 comprises serial-to-parallel converters 205a and 205b, a plurality of mapping function blocks 210, including exemplary mapping function blocks 210a, 210b, 210c and 210d, in-phase and quadrature (I & Q) envelope detector 220, inverse Fast Fourier Transform (IFFT) block 225, peak-to-average power ratio (PAPR) reduction block 230, and peak-to-average power ratio (PAPR) controller 235. Base station 102 further comprises combiner block 240, up-converter 245, power amplifier 250, and antenna 255. In an advantageous embodiment, antenna 255 may comprise a multi-sector antenna array capable of beam-forming.

In the exemplary embodiment described below, base station 102 modulates in-phase (I) signals and quadrature (Q) signals using QPSK modulation. However, in alternate embodiment, base station 102 may use binary phase shift keying (BPSK) or may modulate I and Q signals according to 16 QAM, 64 QAM, and other higher order modulation schemes. For OFDM signals, the subcarrier frequencies are separated by an amount equal to the inverse of the symbol modulation rate. To overcome the PAPR problems presented by large peaks, I & Q envelope detector 220, PAPR reduction block 230, and PAPR controller 235 detect and reduce the amplitudes of large signal peaks to below a predetermined threshold level. In an advantageous embodiment of the disclosure, I & Q envelope detector 220, PAPR reduction block 230, and PAPR controller 235 may be implemented as parts of a digital signal processor (DSP) device. In other embodiments, however, these components may be implemented in other processor structures, such as field programmable gate arrays (FPGAs), programmable logic devices (PLDs), application specific integrated circuits (ASICs), application specific instruction set processors (ASIPs), microprocessors, and other processor structures known to those skilled in the art.

Serial-to-parallel converter 205a receives a serial input stream of user data that has been formatted, encoded and interleaved in earlier baseband processing stages (not shown) and separates the user data stream into parallel data streams. Similarly, serial-to-parallel converter 205b receives a serial input stream of control and pilot signals and separates the control and pilot signal stream into parallel data streams.

Mapping function blocks 210 map each parallel data stream into I and Q modulation symbols. The I and Q modulation symbols from mapping function blocks 210 pass through I & Q envelope detector block 220 before being applied as inputs to IFFT block 225. The function of I & Q envelope detector block 220 will be explained below in greater detail.

For each I or Q input symbol, IFFT block 225 generates a sinc function subcarrier (or sinc(fT)). The subcarrier separation is the inverse of the symbol rate. In the exemplary embodiment in FIG. 1, user data symbols are represented by a set of $2^N$ subcarriers at the output of IFFT block 225 and pilot plus control signals are represented by a set of $2^M$ separate subcarriers at the output of IFFT block 225. The subcarriers from IFFT block 225 pass through PAPR reduction block 230 before being applied as inputs to combiner block 240. The function of PAPR reduction block 220 will be explained below in greater detail.

Combiner block 240 combines the multiple subcarriers prior to up-conversion to the transmission frequency by up-converter 245. For operation in time division duplex (TDD) mode, combiner block 240 inserts a guard interval (GI) in the signal. The output of up-converter 245 is then amplified by power amplifier 250 for transmission via antenna 255.

Figure 3:
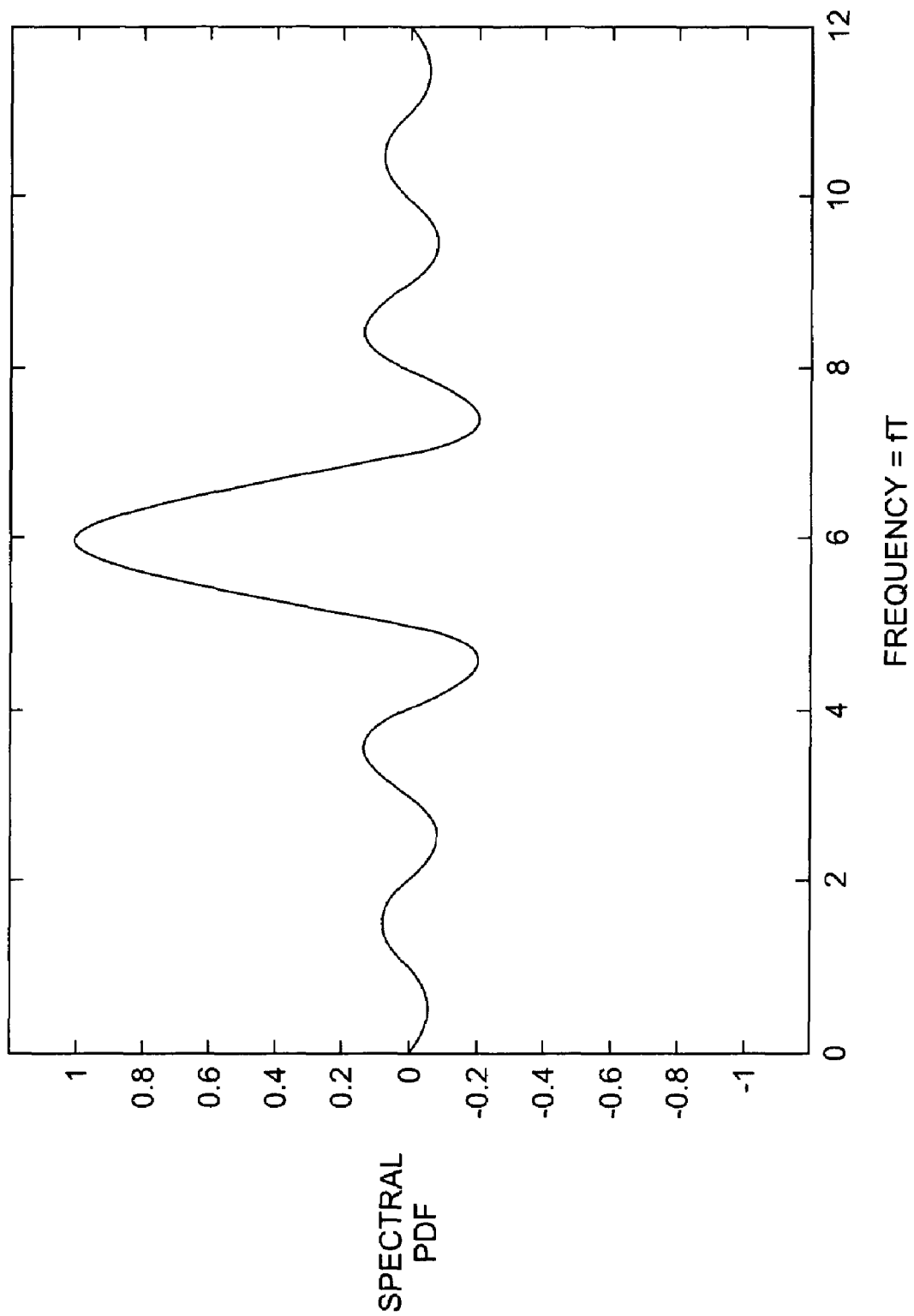
FIG. 3 depicts the sinc(fT) subcarrier corresponding to I or Q modulation by a +1 symbol.
Figure 4:
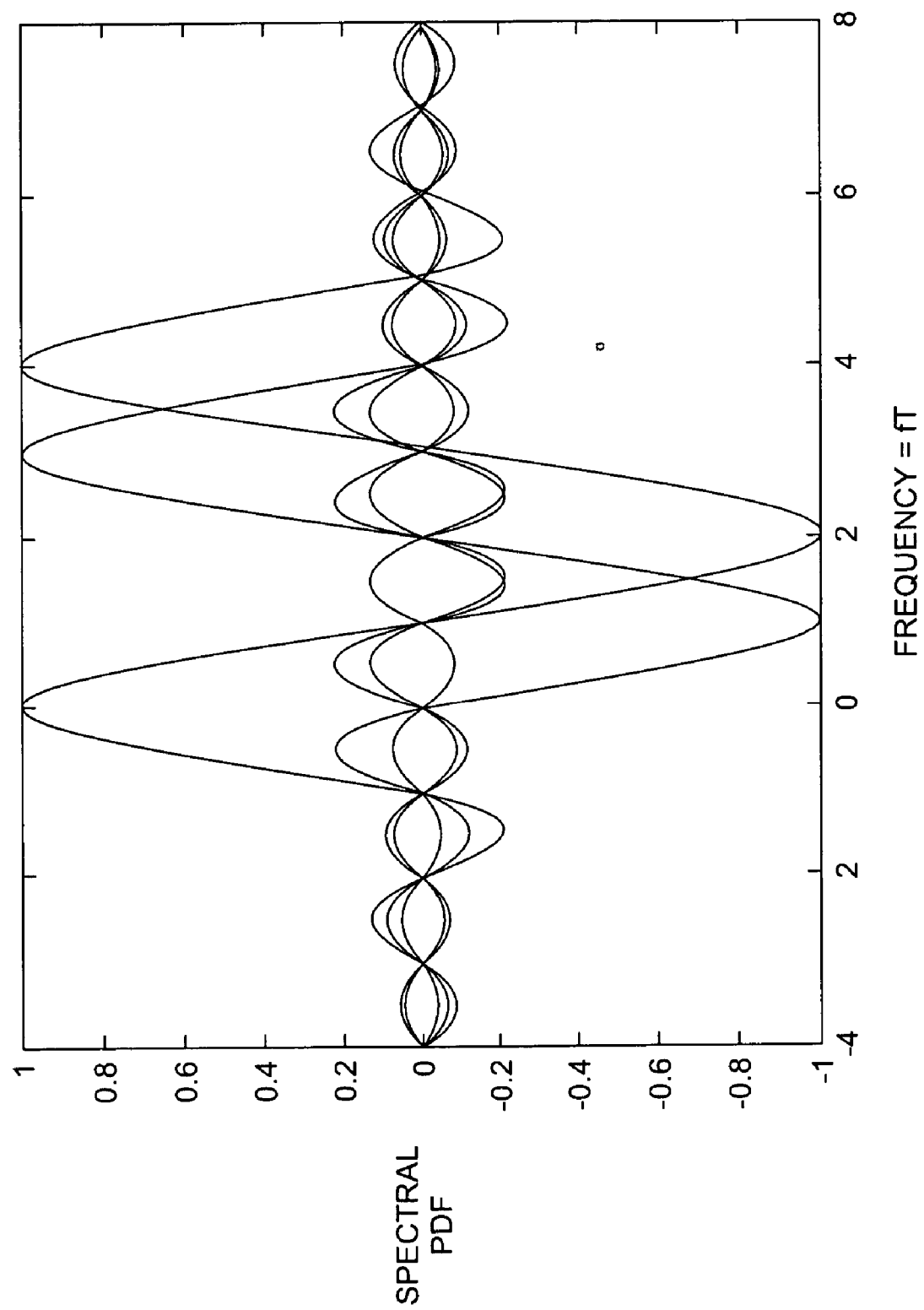
FIG. 4 depicts five sinc(fT) subcarriers corresponding to modulation by the binary symbol set [+1, −1, −1, +1, +1]

As is well known, for each modulation symbol, IFFT block 225 generates a sinc function subcarrier similar to the one illustrated in FIG. 3. The polarity of the sinc function subcarrier is determined by the polarity of the I or Q modulation pulse. FIG. 3 depicts the sinc function subcarrier corresponding to I or Q modulation by a +1 symbol. FIG. 4 depicts five sinc function subcarriers corresponding to modulation by the binary symbol set [+1, −1, −1, +1, +1]. Those skilled in the art will recognize that the time domain response corresponding to sinc(fT) is a pulse of width T and unity amplitude. Further, those skilled in the art will recognize that the method and procedure described herein also apply when subcarriers assigned to different users have amplitudes which differ from unity.

To reduce peak-to-average power ratio (PAPR), I & Q envelope detector 220 reports the combined amplitude for the I and the Q input symbols to PAPR controller 235. If the time domain magnitude of the combined I and Q signals exceeds a specified threshold, PAPR controller 235 determines the magnitude and polarity of a set of sinc function correction carriers to combine with the corresponding I and Q sinc function signals from IFFT block 225 to produce a combined signal that is within allowed limits. PAPR controller 235 transfers the magnitude and polarity of correction symbols (or pulses) corresponding to the sinc function correction carriers to PAPR reduction block 230, which generates the sinc function correction carrier signals. Combiner 240 then combines the sinc function correction carriers with the I and the Q sinc function carriers for the user data and control and pilot signals to produce an output waveform that does not exceed the predetermined threshold.

The PAPR reduction technique may be further explained by the following example. Consider a set of binary data signals of unity relative amplitude for in-phase (I) modulation of the OFDM subcarriers. It is noted that the actual binary data sequence for each subcarrier may have a different amplitude. It is noted also that while the description provided herein pertains to QPSK modulation, actual I and Q modulation sequences for each subcarrier may have different amplitudes, such as for higher order QAM modulation (e.g., 16 QAM, 64 QAM). Further, those skilled in the art will recognize subcarriers assigned to different users have different amplitudes, such as with OFDMA. An example with unity-amplitude bit sequences does not change the basic concept or scope of this disclosure.

Figure 5:
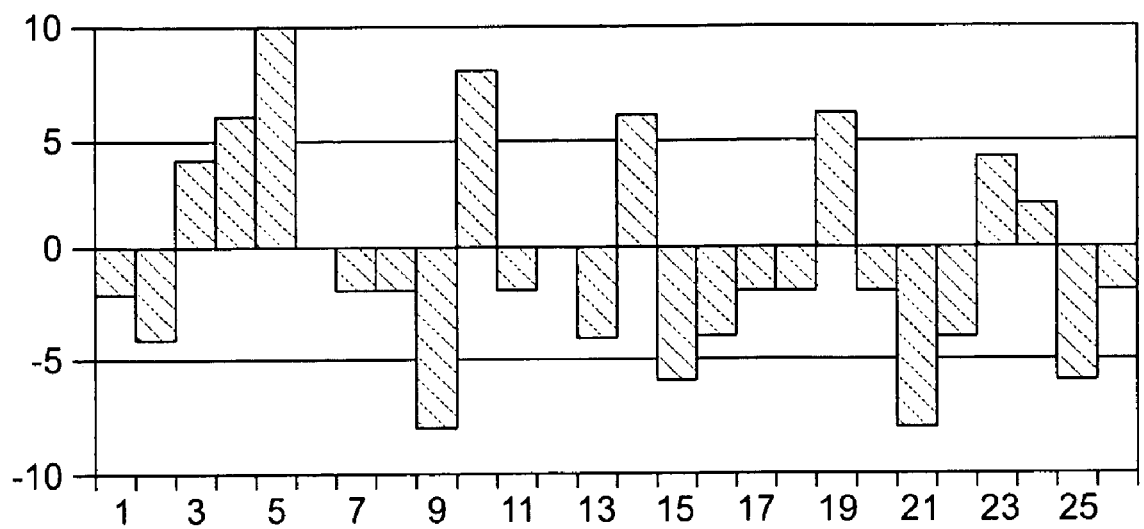
FIG. 5 illustrates a time-domain signal of the combined amplitude of a sequence of I symbols.

I & Q envelope detector 220 combines the amplitudes of the individual bit modulation signals for I modulation to yield an exemplary sequence of combined amplitudes. FIG. 5 illustrates a time-domain signal of the combined amplitude of a sequence of I symbols. I & Q envelope detector 220 reports this sequence to PAPR controller 235.

Figure 6:
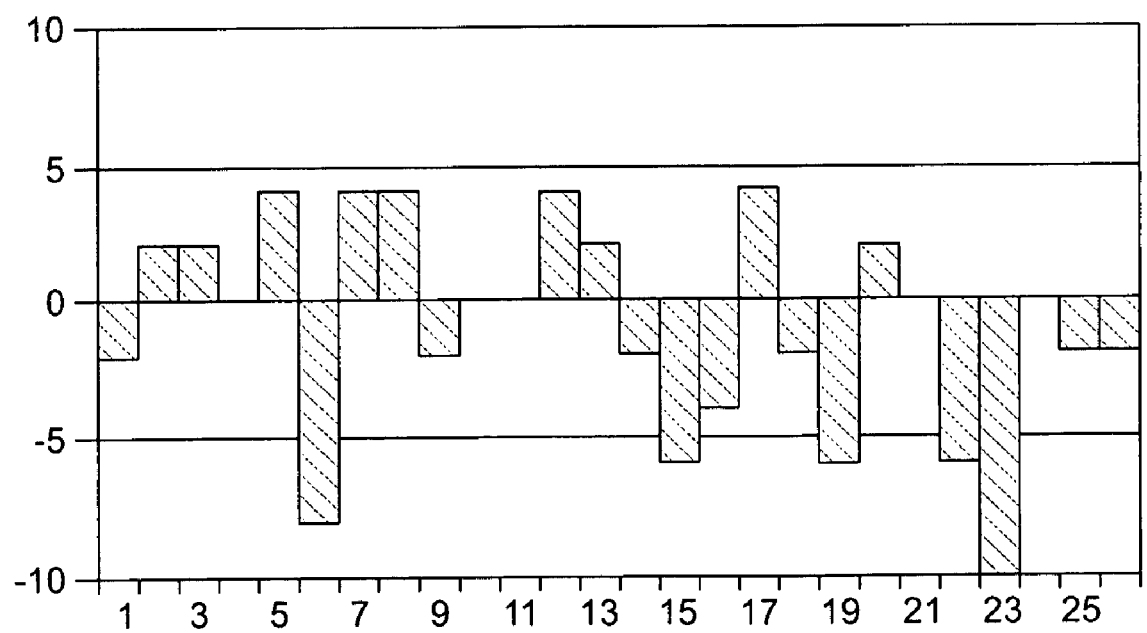
FIG. 6 illustrates a time-domain signal of the combined amplitude of a sequence of Q symbols.

I & Q envelope detector 220 also combines the amplitudes of the individual bit modulation signals for Q modulation to yield a sequence of combined amplitudes. FIG. 6 illustrates a time-domain signal of the combined amplitude of an exemplary sequence of Q symbols. I & Q envelope detector 220 also reports this Q sequence to PAPR controller 235.

Figure 7:
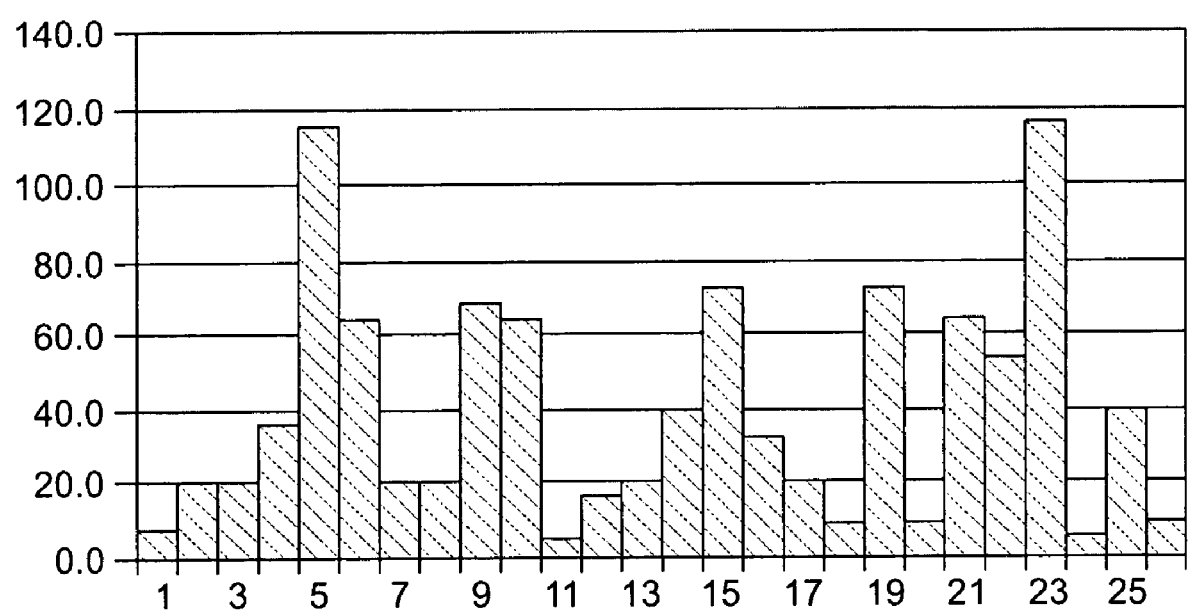
FIG. 7 illustrates the QPSK power envelope of the modulated I and Q carriers.

PAPR controller 235 then calculates the envelope of the combined I and Q symbol amplitudes. FIG. 7 illustrates the relative power output of the QPSK-modulated I and Q carriers. It is noted that large peaks occur during time slot 5 and time slot 23. It will be assumed hereafter that a predetermined threshold of 80 has been set for amplitude peaks. The peaks in time slots 5 and 23 exceed this threshold. However, in alternate embodiments, separate thresholds may be established for the I signal and the Q signal.

Figure 8:
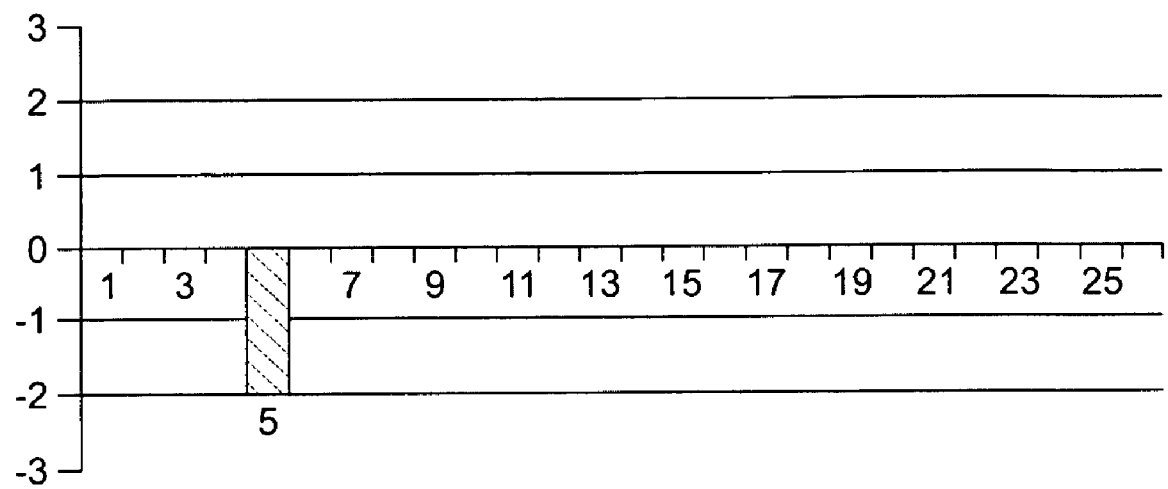
FIG. 8 illustrates a synchronous pulse applied to the I signal during time slot 5 to reduce the PAPR.
Figure 9:
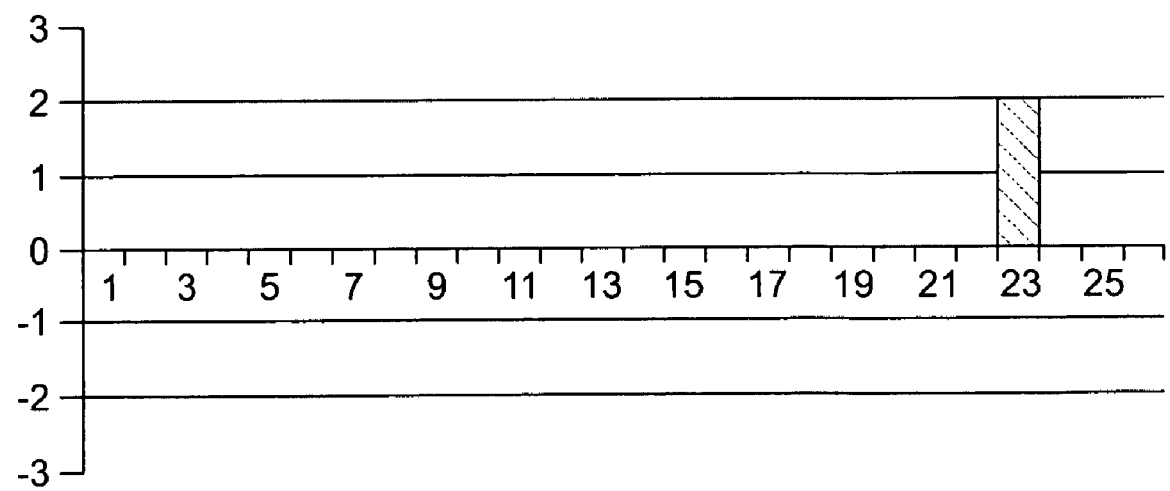
FIG. 9 illustrates a synchronous pulse applied to the Q signal during time slot 23 to reduce the PAPR.

For example, in one embodiment of the present disclosure, if the peak amplitude of either the I-signal or Q-signal reported by I & Q envelope detector 220 exceeds a specified threshold, PAPR controller 235 determines a compensation pulse to be applied to PAPR reduction block 230 to reduce the amplitude of the I or Q signal to the threshold level. FIG. 8 illustrates a synchronous pulse applied to the I signal during time slot 5 to reduce the PAPR. The I signal correction is applied in the FFT domain to the amplitude of each subcarrier that comprises the I signal. Similarly, FIG. 9 illustrates a synchronous pulse applied to the Q signal during time slot 23 to reduce the PAPR. The Q signal correction is applied in the FFT domain to the amplitude of each subcarrier that comprises the Q-signal.

Figure 10:
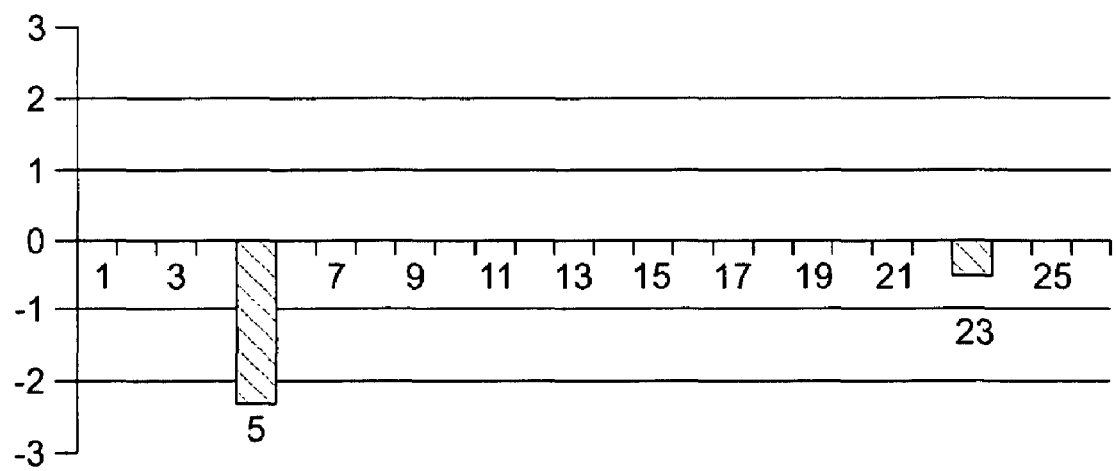
FIG. 10 illustrates synchronous pulses applied to the I signal during time slots 5 and 23 to reduce the PAPR.
Figure 11:
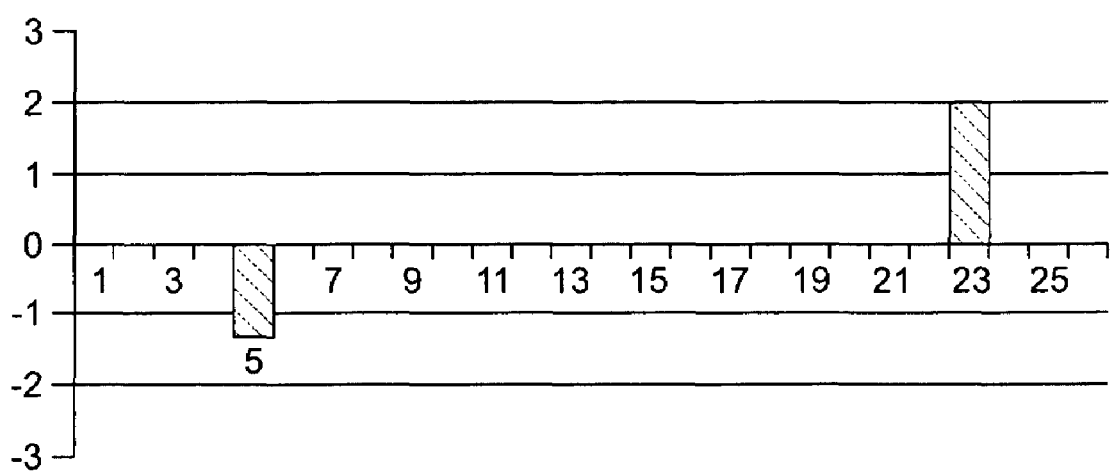
FIG. 11 illustrates synchronous pulses applied to the Q signal during time slots 5 and 23 to reduce the PAPR.

In another embodiment, if the peak amplitude of the QPSK signal detected by I & Q envelope detector 220 exceeds a predetermined threshold, PAPR controller 235 may apply a compensation pulse to the I signal and another compensation pulse to the Q signal to reduce the amplitude of the QPSK signal to the threshold level. FIG. 10 illustrates synchronous pulses applied to the I signal during time slots 5 and 23 to reduce the PAPR. FIG. 11 illustrates synchronous pulses applied to the Q signal during time slots 5 and 23 to reduce the PAPR. The compensation pulses applied to the I signal and the Q signal are scaled so that the phase angle of the I plus Q resultant does not change.

The disclosed transmission path circuits for the base stations and subscriber stations require less processing power and fewer components than conventional systems for PAPR reduction. The disclosed embodiment also requires less processing power and fewer components than amplifier linearization techniques for ACP reduction.

In an alternate embodiment, the PAPR reduction technique may operate in a closed loop form, as opposed to an open loop configuration described above. In such an embodiment, a processor generates a spectral representation of the amplified output of the pulse-compensated signal from samples taken at the amplifier output. The spectral representation of the amplifier output provides an estimate of the adjacent channel power. The level of ACP is used to adjust the amplitude of the pulses generated by PAPR controller 235.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for reducing the peak-to-average power ratio (PAPR) of a multicarrier transmission system comprising:
    a detector for receiving a plurality of symbols to be transmitted and determining a peak amplitude of the plurality of symbols;
    a controller for determining if the peak amplitude associated with the plurality of symbols exceeds a predetermined threshold and, in response to a determination that the peak amplitude exceeds the predetermined threshold, generating at least one correction pulse; and
    a PAPR reduction block for generating at least one correction carrier signal from the at least one correction pulse, wherein the at least one correction carrier signal is combined with a plurality of modulated carrier signals associated with the plurality of symbols to thereby reduce a peak-to-average power ratio associated with the plurality of modulated carrier signals.

2. The apparatus as set forth in claim 1, wherein the plurality of modulated carrier signals comprises one of: orthogonal frequency division multiplexing (OFDM) signals and orthogonal frequency division multiple access (OFDMA) signals.

3. The apparatus as set forth in claim 1, wherein the plurality of symbols to be transmitted comprises a plurality of in-phase symbols and a plurality of quadrature symbols.

4. The apparatus as set forth in claim 3, wherein the at least one correction pulse comprises an in-phase correction pulse generated from the plurality of in-phase symbols and a quadrature pulse generated from the plurality of quadrature symbols.

5. The apparatus as set forth in claim 3, wherein the at least one correction pulse comprises a single correction pulse generated from the plurality of in-phase symbols and the plurality of quadrature symbols.

6. The apparatus as set forth in claim 1, wherein the apparatus is implemented in a mobile terminal capable of communicating with base stations of a wireless network.

7. The apparatus as set forth in claim 1, wherein the apparatus is implemented in a base station of a wireless network.

8. A wireless network base station comprising:
a transmitter capable of transmitting multicarrier signals to subscriber stations in a wireless network; and
an apparatus associated with the transmitter for reducing the peak-to-average power ratio (PAPR) of the multicarrier signals, the apparatus comprising:
  a detector for receiving a plurality of symbols to be transmitted and determining a peak amplitude of the plurality of symbols;
  a controller for determining if the peak amplitude associated with the plurality of symbols exceeds a predetermined threshold and, in response to a determination that the peak amplitude exceeds the predetermined threshold, generating at least one correction pulse; and
  a PAPR reduction block for generating at least one correction carrier signal from the at least one correction pulse, wherein the at least one correction carrier signal is combined with a plurality of modulated carrier signals associated with the plurality of symbols to thereby reduce a peak-to-average power ratio associated with the plurality of modulated carrier signals.

9. The wireless network base station as set forth in claim 8, wherein the plurality of modulated carrier signals comprises one of: orthogonal frequency division multiplexing (OFDM) signals and orthogonal frequency division multiple access (OFDMA) signals.

10. The wireless network base station as set forth in claim 8, wherein the plurality of symbols to be transmitted comprises a plurality of in-phase symbols and a plurality of quadrature symbols.

11. The wireless network base station as set forth in claim 10, wherein the at least one correction pulse comprises an in-phase correction pulse generated from the plurality of in-phase symbols and a quadrature pulse generated from the plurality of quadrature symbols.

12. The wireless network base station as set forth in claim 10, wherein the at least one correction pulse comprises a single correction pulse generated from the plurality of in-phase symbols and the plurality of quadrature symbols.

13. A subscriber station capable of communicating with a wireless network, the subscriber station comprising:
a transmitter capable of transmitting multicarrier signals to the wireless network; and
an apparatus associated with the transmitter for reducing the peak-to-average power ratio (PAPR) of the multicarrier signals, the apparatus comprising:
  a detector for receiving a plurality of symbols to be transmitted and determining a peak amplitude of the plurality of symbols;
  a controller for determining if the peak amplitude associated with the plurality of symbols exceeds a predetermined threshold and, in response to a determination that the peak amplitude exceeds the predetermined threshold, generating at least one correction pulse; and
  a PAPR reduction block for generating at least one correction carrier signal from the at least one correction pulse, wherein the at least one correction carrier signal is combined with a plurality of modulated carrier signals associated with the plurality of symbols to thereby reduce a peak-to-average power ratio associated with the plurality of modulated carrier signals.

14. The subscriber station as set forth in claim 13, wherein the plurality of modulated carrier signals comprises one of: orthogonal frequency division multiplexing (OFDM) signals and orthogonal frequency division multiple access (OFDMA) signals.

15. The subscriber station as set forth in claim 13, wherein the plurality of symbols to be transmitted comprises a plurality of in-phase symbols and a plurality of quadrature symbols.

16. The subscriber station as set forth in claim 15, wherein the at least one correction pulse comprises an in-phase correction pulse generated from the plurality of in-phase symbols and a quadrature pulse generated from the plurality of quadrature symbols.

17. The subscriber station as set forth in claim 15, wherein the at least one correction pulse comprises a single correction pulse generated from the plurality of in-phase symbols and the plurality of quadrature symbols.

18. A method for reducing the peak-to-average power ratio (PAPR) of a multicarrier transmission system, the method comprising the steps of:
receiving a plurality of symbols to be transmitted;
determining a peak amplitude of the plurality of symbols;
determining if the peak amplitude associated with the plurality of symbols exceeds a predetermined threshold;
in response to a determination that the peak amplitude exceeds the predetermined threshold, generating at least one correction pulse;
generating at least one correction carrier signal from the at least one correction pulse; and
combining the at least one correction carrier signal with a plurality of modulated carrier signals associated with the plurality of symbols to thereby reduce a peak-to-average power ratio associated with the plurality of modulated carrier signals.

19. The method as set forth in claim 18, wherein the plurality of modulated carrier signals comprises one of: orthogonal frequency division multiplexing (OFDM) signals and orthogonal frequency division multiple access (OFDMA) signals.

20. The method as set forth in claim 18, wherein the plurality of symbols to be transmitted comprises a plurality of in-phase symbols and a plurality of quadrature symbols.

21. The method as set forth in claim 20, wherein the at least one correction pulse comprises an in-phase correction pulse generated from the plurality of in-phase symbols and a quadrature pulse generated from the plurality of quadrature symbols.

22. The method as set forth in claim 20, wherein the at least one correction pulse comprises a single correction pulse generated from the plurality of in-phase symbols and the plurality of quadrature symbols.

23. The method as set forth in claim 18, wherein the method is implemented in a mobile terminal capable of communicating with base stations of a wireless network.

24. The method as set forth in claim 18, wherein the method is implemented in a base station of a wireless network.

25. An apparatus for reducing the peak-to-average power ratio (PAPR) of a multicarrier transmission system comprising:
a detector for receiving a plurality of symbols to be transmitted and determining a peak amplitude of the plurality of symbols;
a controller for determining if the peak amplitude associated with the plurality of symbols exceeds a predetermined threshold and, in response to a determination that the peak amplitude exceeds the predetermined threshold, generating at least one correction carrier signal,
wherein the at least one correction carrier signal is combined with a plurality of modulated carrier signals associated with the plurality of symbols to thereby reduce a peak-to-average power ratio associated with the plurality of modulated carrier signals.

26. The apparatus as set forth in claim 25, wherein the plurality of modulated carrier signals comprises one of: orthogonal frequency division multiplexing (OFDM) signals and orthogonal frequency division multiple access (OFDMA) signals.

27. The apparatus as set forth in claim 25, wherein the plurality of symbols to be transmitted comprises a plurality of in-phase symbols and a plurality of quadrature symbols.

28. The apparatus as set forth in claim 27, wherein the at least one correction carrier signal comprises a first correction carrier signal generated from the plurality of in-phase symbols and a second correction carrier signal generated from the plurality of quadrature symbols.

29. The apparatus as set forth in claim 27, wherein the at least one correction carrier signal is generated from the plurality of in-phase symbols and the plurality of quadrature symbols.

* * * * *